Nov. 8, 1938.  E. S. ROSCOE  2,136,021

PAPER FASTENER

Filed Oct. 21, 1933  2 Sheets-Sheet 1

INVENTOR
Edwin S. Roscoe
BY D. Clyde Jones
ATTORNEY

Nov. 8, 1938.                    E. S. ROSCOE                    2,136,021
                                 PAPER FASTENER
                             Filed Oct. 21, 1933                 2 Sheets-Sheet 2

INVENTOR
Edwin S. Roscoe
BY D. Clyde Jones
ATTORNEY

Patented Nov. 8, 1938

2,136,021

UNITED STATES PATENT OFFICE 2,136,021

PAPER FASTENER

Edwin S. Roscoe, Rochester, N. Y., assignor to Yawman & Erbe Mfg. Co., Rochester, N. Y., a corporation of New York Application October 21, 1933, Serial No. 694,632

20 Claims. (Cl. 24—153)

The present invention relates to paper fasteners of the type comprising a backing member having spaced projecting, flexible tangs adapted to be inserted through spaced perforations in papers or documents, and a keeper for locking the tangs parallel to the surface of the papers after being thus inserted.

The main feature of the invention resides in a one piece keeper which is easily applied to the tangs and which is securely held thereon except at such time as it is desired to detach the keeper, when it is readily removed.

Another feature of the invention resides in a keeper having a portion normally intervening between the tangs and the file of papers held thereso that the tangs are prevented from mutilating the top sheet of the file.

An additional feature of the invention resides in the provision of a keeper which requires a minimum amount of material in the making thereof and which is economical to manufacture.

Another feature of the invention resides in the ease with which this type of keeper can be applied to the tangs of a fastener. It can be readily applied to such tangs with one hand, if necessary, and in a shorter time than other paper fasteners which require the adjustment of tang-retaining slides.

Figure 2:
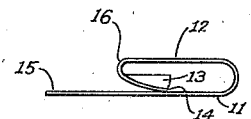
Figure 1:
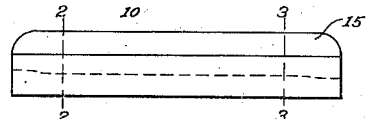
Figure 3:
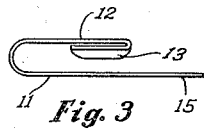
Figure 4:
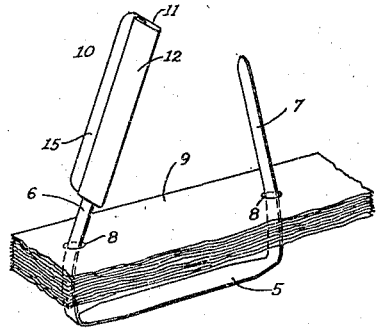
Figure 5:
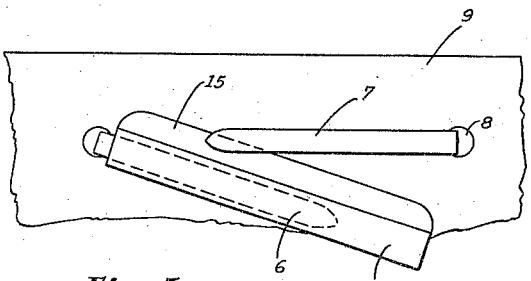
Figure 6:
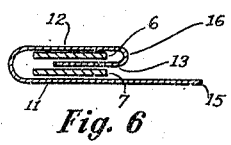
Figure 7:
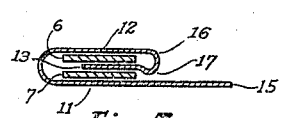
Figure 8:
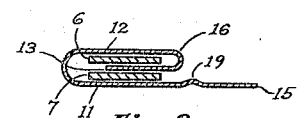
Figure 9:
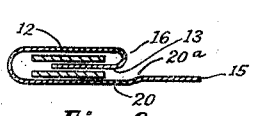
Figure 10:
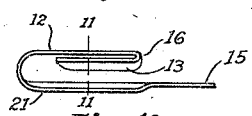
Figure 11:
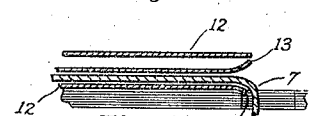
Figure 12:
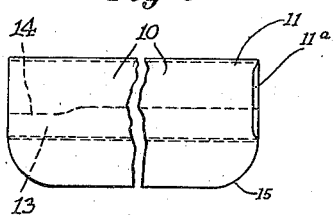
Figure 13:
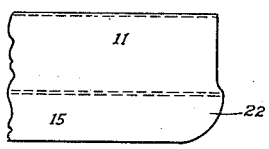
Figure 14:
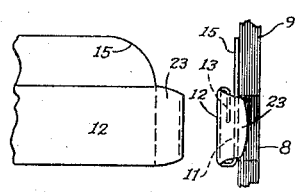
Figure 15:
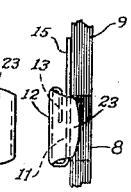
Figure 16:
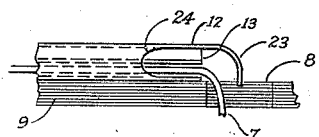
Figure 17:
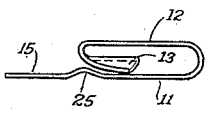
Figure 18:
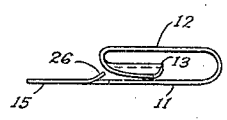
Figure 19:
Figure 20:
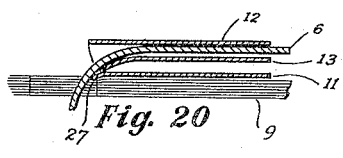
Figure 21:
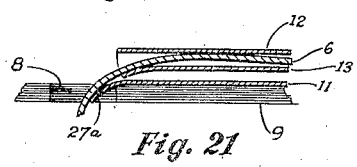
Figure 23:
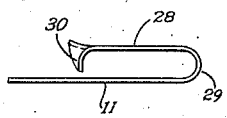
Figure 22:
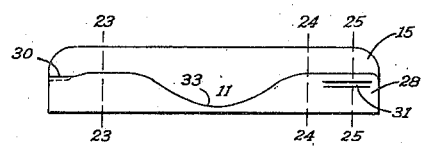
Figure 24:
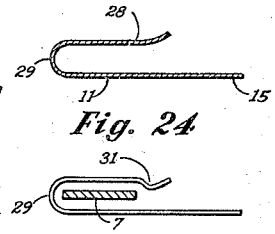
Figure 25:
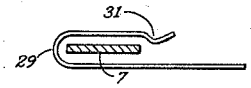
Figure 27:
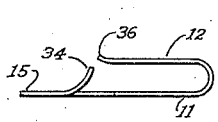
Figure 26:
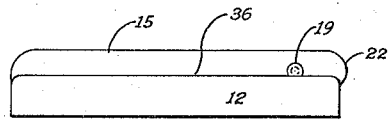
Figure 28:
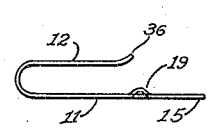
Figure 30:
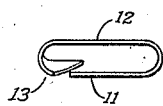
Figure 29:
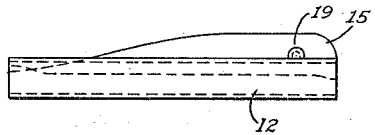
Figure 31:
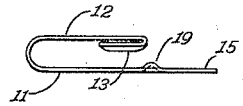
Figure 33:
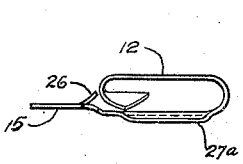
Figure 32:
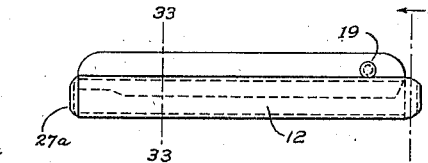
Figure 34:
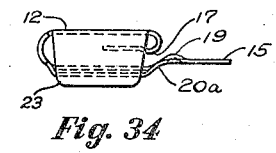
Figure 35:
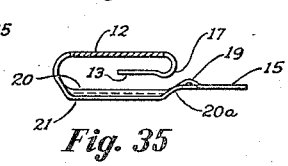

These and other features of the invention will appear from the detailed description and claims when taken with the drawings in which Fig. 1 is a top view of a keeper according to this invention; Fig. 2 is a view of the left end portion of the keeper as far as section line 2—2 as illustrated in Fig. 1; and Fig. 3 is a view of the right end portion thereof as far as the section line 3—3; Fig. 4 is a perspective view of the fastener inserted through a file of papers, and with the keeper shown applied to one of the tangs of the fastener to indicate the initial step in applying the keeper to the tangs; Fig. 5 is a top view of the fastener and keeper indicating a further step in the application of the keeper to the tangs; Fig. 6 is a cross sectional view taken at any point between section lines 2—2 and 3—3 of Fig. 1 showing the relative positions of the tangs in the keeper; Figs. 7, 8 and 9 are similar cross sectional views through section 3—3 indicating several different arrangements by which the righthand tang of the fastener, as herein illustrated, can be retained in the keeper; Fig. 10 is a right end view of a modified form of keeper and Fig. 11 is a longitudinal sectional fragment thereof taken substantially on the section line 11—11 of Fig. 10 showing an arrangement to catch the bent-over portion of the right tang in order to prevent its unintentional removal from the keeper; Figs. 12 and 13 are fragmentary bottom views of modified forms of the righthand portion of the keeper as illustrated in Fig. 1; Figs. 14 and 15 illustrate respectively a top view of a fragment of the righthand portion of a modified form of keeper and an end view thereof; Fig. 16 shows a side view of a fragment of the righthand portion of the keeper as illustrated in Figs. 14 and 15, showing the manner in which a resilient lock formed as a part of the keeper is arranged to enter a perforation in the file of papers and thereby further assists in holding the keeper on the tangs; Figs. 17 and 18 illustrate different modified forms of the lefthand portion of a keeper as illustrated in Fig. 1, showing arrangements by which an inexperienced user can be prevented from attempting to apply the keeper to the lefthand tang by a lateral movement of the keeper; Fig. 19 is an end view of a modified form of the left end of the keeper and Fig. 20 is a longitudinal section of a fragment thereof indicating how the lefthand portion of the keeper can be made to prevent sharp bends being formed in the lefthand tang during the application of the keeper thereto and thereby obviate the formation of corrugations in this tang; Fig. 21 illustrates a longitudinal section similar to that illustrated in Fig. 20, except that the means which protects the lefthand tang from sharp bends normally extends from the body of the keeper into the perforations through which this tang passes; Fig. 22 is a top view of a keeper, omitting the second longitudinal fold in the keeper as shown in the foregoing figures but embodying the main principles thereof; Fig. 23 is an end view looking at the lefthand end of this last-mentioned keeper; Fig. 24 is a cross-section taken either on the section lines 23—23 or 24—24, while Fig. 25 is a cross section view thereof taken on the line 25—25 of Fig. 22 and also indicating therein a section of a tang; Fig. 26 is a plan view of a modified form of keeper similar to that disclosed in Fig. 22, whereas, Figs. 27 and 28 are respectively left and right hand views of this keeper; Fig. 29 is a plan view and Figs. 30 and 31 are respectively left and right hand views of still a different form of keeper; and Fig. 32 is a plan view of a somewhat different form of keeper; Fig. 33 is a view of the left end thereof as far as section line 33—33 of Fig. 32; Fig. 34 is a right end view of this keeper and Fig. 35 is a cross-section thereof taken on the line 35—35 looking in the direction of the arrows.

Referring to the drawings, 5 designates the base of a fastener having tangs 6 and 7 of resilient material which can be bent at right angles to the base for insertion through the perforations such as 8 in a file of papers 9, and which can thereafter be bent parallel to the plane of the topmost sheet of the file, where they are held by a detachable keeper designated 10. It will be understood that the invention includes spaced flexible tangs separately fastened to a backing piece such as a binder or folder. The keeper is made of one piece of sheet metal or like material and comprises a base member 11 with a lip 15 adapted to lie on the topmost sheet of the file. This base member is somewhat wider than the width of the tangs and is folded at one edge to form a top member 12 extending in a plane parallel to the principal plane of the base member, but spaced therefrom. The spacing of top member 12 and the base member 11 is such as to permit tang 6 and tang 7 to be held in superimposed relation in the keeper. The top member is also folded at 16 to form a spacing and retaining strip 13 extending between the top member and the base member with its free edge directed toward the fold between these members. As shown in Fig. 2 the left end of this folded retaining strip is bent downward until its edge 14 engages the base member 11 to define an opening to receive the left tang, whereas, the right end portions of this strip as shown in Fig. 3 is inclined upwardly toward the member 12 so that sufficient space is provided between the lower surface of the strip and the upper surface of the base member to facilitate the insertion of the right tang 7 under the spacing member 13.

In applying the keeper to the tangs 6 and 7 as shown in Fig. 4, these tangs will at first extend upwardly in a position approximately vertical as they protrude through the perforations 8 in the file of papers. The keeper is placed on these tangs by inserting the tang 6 into the opening defined by the left end of the strip 13 while this tang is in a vertical or inclined position with respect to the upper surface of the papers. Thereafter, the tang 6 with the keeper 10 thereon is bent downward into the principal plane of the file as shown in Fig. 5. The tang 7 is bent downward until it engages or is parallel with the upper surface of the papers; it is convenient but not necessary that the end of the tang 7 engage the upper surface of the lip 15. Then the keeper with tang 6 enclosed within it, is rotated in the plane of the papers so as to engage tang 7, between the base member 11 and retaining strip 13, until the bent-over portions of both tangs are parallel with each other and superimposed when they are long enough to overlap as shown in Fig. 6. Usually the tang 7 engages the upper surface of the base member and the lower surface of the strip 13 with sufficient friction to retain it in engagement with the keeper. However, the fold 16 may be formed to provide a rib 17 therein which restricts the entrance to the space between the base member and the retaining strip.

In Fig. 8 a rib 19 is struck up from the base member to restrict the opening between the retaining strip and the base member and therefore retain the tang 7 in engagement with the keeper. A somewhat different arrangement for accomplishing this result is disclosed in Fig. 9, wherein the base member 11 is provided with a depressed portion 20 which is wider than the tang 7, forming an offset 20a which resists the removal of the keeper from this tang.

The portions of the keeper designed to resist the passage of the right tang, illustrated by 17, Fig. 7; 19, Fig. 8; 20a, Fig. 9; 19, Fig. 26, and Fig. 28, 19, Fig. 29 and 31, may extend the entire length of the lip 15, or its length may be limited to a short embossing near the right end of the keeper as illustrated by Figs. 22, 26 and 29.

Figs. 10 and 11 illustrate another arrangement in which the keeper resists removal from tang 7. The right end of the base member of said keeper has a depressed portion 21 in which the bent portion of tang 7 drops when keeper is in place.

In Figs. 12 and 13, there are disclosed arrangements whereby the keeper is locked on the fastener in a slightly different manner. As shown in Fig. 12 the right end of the base member 11 is cut out as indicated at 11a to permit the tang 7 to enter a recess formed thereby and thus permit a longitudinal locking movement of the keeper. This same result is achieved in the arrangement of Fig. 13 by extending the right end of the base member to provide a lug as indicated at 22. In inserting the tangs in this keeper, the keeper is manipulated as shown in Figs. 4 and 5, but after it is positioned so that the tangs are in parallel relation under the retaining strip, it is moved toward the right so that the tang 7 engages the cut-out portion 11a or recess at the right end of the base member.

A different locking arrangement for the right-hand tang 7 is shown in Figs. 14 and 15 wherein the top member 12 is provided with a downturned lug 23, which lug is adapted to engage the perforation 8 adjacent the tang 7. In using the locking arrangement of Figs. 14 and 15, when the tang 7 is being inserted by a lateral movement thereof as previously described, the lug 23 at the right end of the top member engages the surface of top sheet in the file and enters its related perforation 8 in the file. In order to make the mounting of the lug 23 more resilient, a cut-out portion 24 as shown in Fig. 16, is provided in the fold between the base member 11 and the top member 12, in this instance also, the lug 23 likewise engages the perforation 8 in the file of papers.

In Figs. 17 and 18 there is provided positive means for discouraging an inexperienced operator from attempting to insert the left tang 6 edgewise into the keeper. Projection 25 is made in the base member 11 to conform to the shape of the retaining strip 13 and thereby prevent any attempt to insert this tang laterally. As shown in Fig. 18 a struck up lug 26 in approximate engagement with the retaining strip 13, accomplishes the same result.

In Figs. 19, 20 and 21 there are shown different arrangements of the left-hand portion of the keeper, which prevent sharp bends being formed in the tang 6 when it is inserted in the keeper. As shown in the first two mentioned figures, the base member is provided with a depressed curved lip 27 so that a gradual bend is formed in the tang 6 when it is bent into the plane of the papers by the keeper. As shown in Fig. 21 the lip is extended as indicated at 27a so that it projects into the adjacent perforation 8 in the file of papers.

In the modified form of keeper shown in Figs. 22, 23, 24 and 25, the keeper while still made from a single piece of sheet metal material has but a single fold and the retaining strip as shown in the foregoing figures, has been omitted. This keeper likewise has a base member 11 with a projecting lip 15 integral with and in the same plane with the base member. There is also attached to one edge of the base member in spaced relation thereto a top member designated 28 having an upwardly flared edge to facilitate inserting the tang 7 into the keeper. This top member is formed by folding the material of the base member as indicated at 29 to provide sufficient space between the base member and the top member to retain tangs 6 and 7. The left end of the top member as herein illustrated, is provided with a downturned lug 30 in engagement or slightly spaced from the base member. This lug completes the end opening in the left end of the keeper to receive the tang 6. The right end portion of the top member is provided with a depressed rib 31 as shown in Figs. 22 and 25 which is spaced just sufficiently to permit tang 7 to pass under the top member and yet be retained therein by the depressed rib. The top member of this keeper may be provided with a cut-out portion 33 to expose the ends of the tangs 6 and 7 so that they may be readily arranged in superposed relation under this member. However, the invention is not limited to the provision of this cut-out portion in the top member, as will be seen from the form of keeper shown in Figs. 26, 27 and 28. In this last-mentioned keeper there is a base member 11 provided with a lip 15 and a top member 12. This top member is folded in substantially the same manner as in the foregoing form of keeper, but the lug 30 thereon has been omitted and instead a lug 34 is struck up from the base member in close relation to the top member, at the left end of the keeper to form an end opening therein which receives the tang 6. In this arrangement the rib 31 in the top member has been omitted and instead an upwardly extending nib 19 is formed in the base member adjacent the free edge of this top member. It will be noted that the free edge 36 of the top member is bent slightly away from the base member to facilitate the insertion of the tang 7 in the keeper. If desired the lip 15 may project endwise at 22 as more fully disclosed in Fig. 13 so that after the tangs 6 and 7 have been inserted in the keeper, it can be moved endwise toward the right as shown so that lug 22 will serve as a definite lock for tang 7.

In the further modified form of the invention shown in Figs. 29, 30 and 31, the keeper is formed of a base member 11 having an extended lip 15 at one end thereof, a top member 12 and a retaining strip 13 lying between these members, as shown in the arrangements of Figs. 1 to 21 inclusive. However, the base member of this keeper is of varying width, tapering from the lip 15 at its right end to a position adjacent the free edge of the inturned retaining strip 13. It will be noted that lip 15 is provided with a raised portion 19 adjacent the entrance to the space under the retaining strip at the right end portion of the keeper.

In Figs. 32, 33, 34 and 35 there is illustrated a keeper incorporating the several tang-engaging means of Figs. 7, 8, 9, 10 and 11, 14 and 15 at the right end thereof, and the several tang-engaging means of Figs. 18, 19, 20 and 21 at the left end thereof.

In all of these arrangements the tang 6 is inserted into the left end of the keeper as shown in Fig. 4 and the tang 7 is inserted under the top member or the retaining strip as the case may be, by a lateral swinging movement of the keeper as shown in Fig. 5.

It will be appreciated that the various features of the several fasteners may be used in different combinations from those herein disclosed and there may be many variations and modifications of the present invention other than those herein shown without departing from the spirit thereof.

What I claim is:

1. A keeper for use with the base and end tangs of a paper fastener, said keeper being substantially channel shaped in cross-section with one of the sides thereof of a length less than the space between the tangs, one end of said channel-shaped keeper being made to define an open end therein whereby one tang is insertable lengthwise into the keeper and the other tang is insertable laterally between the sides of the keeper so that one side thereof separates the ends of the tangs from the top sheet of the file.

2. A keeper for use with the base and end tangs of a paper fastener, said keeper being formed of a single piece of sheet material folded lengthwise to provide a base member and a top member in spaced relation, means at one end of said keeper cooperating with said members to define an open end therein for receiving one of said tangs endwise, said members at the other end of said keeper being sufficiently spaced apart to receive and to retain, the other of said tangs laterally thereof.

3. A keeper for use with the base and end tangs of a paper fastener, said keeper comprising a top member and a base member in spaced relation thereto, said base member having a lip projecting laterally therefrom beyond the top member, and means including a portion of the base member and the top member to define an open end in the keeper for receiving one of said tangs lengthwise thereof, the members at the other end of said keeper being spaced apart to receive the other tang laterally of the keeper.

4. A keeper for use with the base and end tangs of a paper fastener, said keeper comprising a top member and a base member in spaced parallel relation thereto, said base member having a lip projecting laterally therefrom beyond the top member, means including a portion of the base member together with a raised portion thereof, as well as the top member to define an open end in the keeper for receiving one of said tangs lengthwise thereof, said members at the other end of said keeper being spaced apart to receive the other tang of said fastener laterally of the keeper.

5. A keeper for use with the base and end tangs of a paper fastener, said keeper comprising a top member and a base member in spaced parallel relation thereto, said base member having a lip projecting laterally therefrom beyond the top member, means including a portion of the base member together with a lug struck-up therefrom, as well as the top member to define an open end in the keeper for receiving one tang lengthwise thereof, the members at the other end of said keeper being spaced apart to receive the other tang of said fastener laterally of the keeper.

6. A keeper for use with the base and end tangs of a paper fastener, said keeper comprising a base member, a top member integral therewith and folded into a plane overlapping the base member, a retaining strip integral with said top member and interposed between said top member and said base member, one portion of said retaining strip being positioned adjacent said base member to define an open ended keeper wherein one of said tangs is insertable lengthwise thereof, the other end of said retaining strip having a portion adjacent said top member and spaced from said base member whereby the other tang of the fastener is insertable laterally between the retaining strip and the base member for retention therein.

7. A keeper for use with the base and end tangs of a paper fastener, said keeper comprising a base member, a top member integral therewith and folded into a plane parallel to and overlapping the plane of the base member, a retaining strip folded from said top member and interposed between said top member and said base member, one portion of said retaining strip being positioned adjacent said base member to define an open end keeper, wherein one of said tangs is insertable lengthwise of the keeper, the other end of said retaining strip having a portion adjacent said top member but spaced from said base member whereby the other tang is inserted laterally between the retaining strip and the base member, the fold between said strip and said top member projecting to a point near said base member whereby said last-mentioned tang is retained in the keeper.

8. A keeper for use with the base and end tangs of a paper fastener, said keeper comprising a base member and a top member extending in spaced overlapping planes, a retaining strip integral with said top member and interposed between said top member and said base member, one portion of said retaining strip being positioned adjacent said base member to define with said member an open ended keeper whereby one of said tangs is insertable lengthwise of the keeper, the other end of said retaining strip having a portion extending adjacent said top member whereby the other tang is insertable laterally between the retaining strip and the base member, and means at the last-mentioned end of said keeper to retain a tang therein.

9. A keeper for use with the base and end tangs of a paper fastener, said keeper comprising a base member and a top member integral therewith and folded into overlapping planes, a retaining strip integral with said top member and interposed between said top member and said base member, one portion of said retaining strip being positioned adjacent said base member to define an open ended keeper whereby one of said tangs is insertable lengthwise of the keeper, the other end of said retaining strip having a portion adjacent said top member to define a lateral opening between said strip and said base member through which the other tang is insertable laterally, and a projection on said keeper restricting the entrance to said lateral opening.

10. A keeper for use with the base and end tang of a paper fastener, said keeper being formed of a single piece of sheet material folded lengthwise to provide a base member and a top member in spaced relation, means at one end of said keeper cooperating with said members to define an open end therein for receiving one of said tangs endwise, said members at the other end of said keeper being sufficiently spaced apart to receive the other of said tangs laterally thereof, and a projection on said base member adjacent the free edge of said top member to retain the last-mentioned tang in the keeper.

11. A keeper for use with the base and end tangs of a paper fastener, said keeper being formed of a single piece of sheet material folded lengthwise to provide a base member and a top member in spaced relation, means at one end of said keeper cooperating with said members to define an open end therein for receiving one of said tangs endwise, said members at the other end of said keeper being sufficiently spaced apart to receive the other of said tangs laterally thereof, and a projection on the top member near the free edge thereof extending adjacent said base member to retain the last mentioned tang in the keeper.

12. A keeper for use with the base and end tangs of a paper fastener, said keeper being formed of a single piece of sheet material folded lengthwise to provide a base member and a top member in spaced relation, means at one open end of said keeper to define an end therein for receiving one of said tangs endwise, said last-mentioned end of the base member adjacent its edge being provided with a curved surface whereby it forms a wide bend in the last-mentioned tang during use, said members at the other end of the keeper being sufficiently spaced apart to receive and retain the other of said tangs laterally thereof.

13. A keeper for use with the base and end tangs of a paper fastener, said keeper being formed of a single piece of sheet material folded lengthwise to provide a base member and a top member in spaced relation, a lug at one end of said top member projecting toward said base member to define with said members an open end in the keeper for receiving one of said tangs endwise, said members at the other end being sufficiently spaced apart to receive and retain the other of said tangs laterally thereof.

14. A keeper for use with the base and end tangs of a paper fastener, said keeper being formed of a single piece of sheet material folded lengthwise to provide a base member and a top member in spaced relation, means at one end of said keeper cooperating with said member to define an open end therein for receiving one of said tangs endwise, said member at the other end of the keeper being sufficiently spaced apart to receive the other of said tangs laterally thereof, the edge of the base member at the last-mentioned end of said keeper having a recess therein to receive the bent portion of its related tang.

15. A keeper for use with the base and end tangs of a paper fastener, said keeper being formed of a single piece of sheet material folded lengthwise to provide a base member and a top member in spaced relation, means at one end of said keeper cooperating with said members to define an open end therein for receiving one of said tangs endwise, said members at the other end of the keeper being sufficiently spaced apart to receive the other of said tangs laterally thereof, and a portion of said top member at the last-mentioned end of said keeper projecting beyond the plane of the base member whereby said projection may enter the perforation in a stack of papers through which its related tang is inserted.

16. A keeper for use with the base and end tangs of a paper fastener, said keeper being formed of a single piece of sheet material folded lengthwise to provide a base member and a top member in spaced relation, means at one end of said keeper cooperating with said members to define an open end in the keeper receiving one of said tangs endwise, said members at the other end of the keeper being sufficiently spaced apart to receive the other of said tangs laterally thereof, and means at said last-mentioned end of said members to frictionally retain the last-mentioned tang therein, said top member having a cutout portion exposing a part of said tangs when inserted in the keeper, whereby the relation between said tangs may be adjusted.

17. A keeper for use with the base and end tangs of a paper fastener, said keeper being formed of a single piece of sheet material folded lengthwise to provide a base member and a top member in spaced relation, means at one end of said keeper to define an open end therein for receiving one of said tangs endwise, said members at the other end of the keeper being sufficiently spaced apart to receive the other of said tangs laterally thereof, the base member at the last-mentioned end of the keeper having a portion depressed away from said top member whereby said last-mentioned tang is retained in the keeper.

18. A keeper for use with the base and end tangs of a paper fastener, said keeper being formed of a single piece of sheet material folded lengthwise to provide a base member and a top member in spaced relation, means at one open end of said keeper to define an end therein for receiving one of said tangs endwise, said members at the other end of the keeper being sufficiently spaced apart to receive the other of said tangs laterally thereof, the last-mentioned end of said base member having a cutout portion whereby the last-mentioned tang is locked in the recess by an endwise movement of the keeper in the direction of this tang.

19. A keeper for use with the base and end tangs of a paper fastener, said keeper being substantially channel-shaped in cross-section, one end of said channel-shaped keeper defining an end opening therein to receive a tang insertable lengthwise thereof, the top and bottom of said keeper at the other end thereof being sufficiently spaced apart to receive and to retain another tang laterally thereof.

20. A keeper for use with the base and end tangs of a paper fastener, said keeper having a base member of a length less than the distance between said tangs and a top member integral with and in spaced relation to said base member whereby a lateral opening is provided in said keeper, and means adjacent one end of said keeper for closing a portion of said lateral opening to define with said base member and said top member, an opening in one end of said keeper.

EDWIN S. ROSCOE.

CERTIFICATE OF CORRECTION.

Patent No. 2,136,021.  November 8, 1938.

EDWIN S. ROSCOE.

It is hereby certified that error appears in the printed specification of the above numbered patent requiring correction as follows: Page 4, second column, line 10, and page 5, first column, line 18, claims 12 and 18 respectively, strike out the word "open" and insert the same before "end", second occurrence, page 4, second column, line 11, and page 5, first column, line 19, same claims; and that the said Letters Patent should be read with this correction therein that the same may conform to the record of the case in the Patent Office.

Signed and sealed this 27th day of December, A. D. 1938.

Henry Van Arsdale (Seal)                 Acting Commissioner of Patents.